(12) United States Patent
Dexter et al.

(10) Patent No.: US 7,507,063 B2
(45) Date of Patent: Mar. 24, 2009

(54) SNAP RING WITH RECESSED INTERIOR CONTOUR

(75) Inventors: David Django Dexter, Buellton, CA (US); Damon Douglas Brink, Goleta, CA (US); Ryan John Schmidt, Santa Barbara, CA (US); Matthew S. Sprankle, Santa Barbara, CA (US); Kevin Patrick Hanrahan, Santa Barbara, CA (US)

(73) Assignee: Intri-Plex Technologies, Inc., Goleta, CA (US)

( * ) Notice: Subject to any disclaimer, the term of this patent is extended or adjusted under 35 U.S.C. 154(b) by 44 days.

(21) Appl. No.: 10/812,615

(22) Filed: Mar. 29, 2004

(65) Prior Publication Data

US 2005/0214101 A1    Sep. 29, 2005

(51) Int. Cl.
   *F16B 21/18*   (2006.01)
   *G11B 21/00*   (2006.01)
(52) U.S. Cl. .................. 411/419; 411/417; 360/265.2
(58) Field of Classification Search ............. 411/353, 411/517–519, 530; 360/265.2–265.9, 99.08
See application file for complete search history.

(56) References Cited

U.S. PATENT DOCUMENTS

| | | | | |
|---|---|---|---|---|
| 2,025,848 A | * | 12/1935 | Collis | 411/517 |
| 2,136,155 A | * | 11/1938 | Spicacci | 384/539 |
| 2,491,306 A | * | 12/1949 | Feitl | 411/518 |
| 2,491,310 A | * | 12/1949 | Heimann | 411/518 |
| 2,595,787 A | * | 5/1952 | Heimann | 24/16 R |
| 2,897,022 A | * | 7/1959 | Marola | 384/584 |
| 3,045,265 A | * | 7/1962 | Seibert et al. | 408/234 |
| 3,104,905 A | * | 9/1963 | Erdmann | 292/256.6 |
| 3,595,123 A | * | 7/1971 | Wurzel | 411/517 |
| 4,099,444 A | * | 7/1978 | Millheiser et al. | 411/517 |
| 4,113,397 A | * | 9/1978 | Snyder | 403/154 |
| 4,182,578 A | * | 1/1980 | Livesay et al. | 403/317 |
| 4,183,280 A | * | 1/1980 | Hashimoto | 411/518 |
| 4,195,944 A | * | 4/1980 | Cross | 403/326 |
| 4,288,172 A | * | 9/1981 | Livesay et al. | 403/317 |
| 4,343,581 A | * | 8/1982 | Millheiser | 411/517 |
| 4,470,735 A | * | 9/1984 | Salisbury | 411/353 |
| 4,568,059 A | * | 2/1986 | Kawase et al. | 251/99 |
| 4,934,888 A | * | 6/1990 | Corsmeier et al. | 411/353 |
| 5,383,938 A | * | 1/1995 | Rohr et al. | 623/22.29 |
| 6,113,306 A | * | 9/2000 | Allert | 403/344 |
| 6,856,485 B2 | * | 2/2005 | Toh et al. | 360/99.08 |

* cited by examiner

*Primary Examiner*—Flemming Saether
(74) *Attorney, Agent, or Firm*—Joshua C. Harrison; Barcelo & Harrison, LLP

(57) ABSTRACT

A snap ring for applications requiring cleanliness has a novel recessed interior contour that reduces debris generation during installation of the snap ring. The snap ring is suitable for applications where a reduction in debris generation is desirable, such as to retain an actuator pivot bearing in information storage devices like magnetic hard disk drives.

8 Claims, 4 Drawing Sheets

SNAP RING WITH RECESSED INTERIOR CONTOUR

BACKGROUND OF THE INVENTION

1. Field of the Invention

This invention relates generally to snap rings designed for use in clean environments and particularly to snap rings for use in information storage devices.

2. Background Information

In hard disk drives, magnetic heads read and write data on the surfaces of co-rotating disks that are co-axially mounted on a spindle motor. The magnetically-written "bits" of written information are therefore laid out in concentric circular "tracks" on the surfaces of the disks. The disks must rotate quickly so that the computer user does not have to wait long for a desired bit of information on the disk surface to translate to a position under the head. In modern disk drives, data bits and tracks must be extremely narrow and closely spaced to achieve a high density of information per unit area of the disk surface.

The required small size and close spacing of information bits on the disk surface has consequences on the design of the disk drive device and its mechanical components. Among the most important consequences is that the magnetic transducer on the head must operate in extremely close proximity to the magnetic surface of the disk. However, because there is relative motion between the disk surface and the head due to the disk rotation and head actuation, continuous contact between the head and disk can lead to tribological failure of the interface. Such tribological failure, known colloquially as a "head crash," can damage the disk and head, and usually causes data loss. Therefore, the magnetic head is typically designed to be hydrodynamically supported by an extremely thin air bearing so that its magnetic transducer can operate in close proximity to the disk while physical contacts between the head and the disk are minimized or avoided.

The head-disk spacing present during operation of modern hard disk drives is extremely small—measuring in the tens of nanometers. Obviously, for the head to operate so closely to the disk the head-disk interface must be kept clear of debris and contamination—even microscopic debris and contamination. In addition to tribological consequences, contamination and debris at or near the head disk interface can force the head away from the disk. The resulting temporary increases in head-disk spacing cause magnetic read/write errors. Accordingly, magnetic hard disk drives are assembled in clean-room conditions and the constituent parts are subjected to pre-assembly cleaning steps during manufacture.

Another consequence of the close spacing of information bits and tracks written on the disk surface is that the spindle rotation and head actuator motion must be of very high precision. The head actuator must have structural characteristics that allow it to be actively controlled to quickly seek different tracks of information and then precisely follow small disturbances in the rotational motion of the disk while following such tracks.

Characteristics of the actuator structure that are important include stiffness, mass, geometry, and boundary conditions. For example, one important boundary condition is the rigidity of the interface between the actuator arm and the actuator pivot bearing.

All structural characteristics of the actuator, including those mentioned above, must be considered by the designer to minimize vibration in response to rapid angular motions and other excitations. For example, the actuator arm can not be designed to be too massive because it must accelerate very quickly to reach information tracks containing desired information. Otherwise, the time to access desired information may be acceptable to the user.

On the other hand, the actuator arm must be stiff enough and the actuator pivot bearing must be of high enough quality so that the position of the head can be precisely controlled during operation. Also, the interface between the actuator arm and the pivot bearing must be of sufficient rigidity and strength to enable precise control of the head position during operation.

Actuator arm stiffness must also be sufficient to limit deflection that might cause contact with the disk during mechanical shock events that may occur during operation or non-operation. Likewise, the interface between the actuator arm and the pivot bearing must be of sufficient strength to prevent catastrophic structural failure such as axial slippage between the actuator arm and the actuator pivot bearing sleeve during large mechanical shock events.

In many disk drives, the actuator arm (or arms) is fixed to the actuator pivot bearing sleeve by a snap ring known as the actuator pivot bearing snap ring. The actuator pivot bearing snap ring typically includes one or more out-of-plane bends that function as a preloaded axial spring after assembly. The action of the actuator pivot bearing snap ring as a preloaded axial spring prevents separation and slippage at the interface between the actuator arm and the pivot bearing during operation and during mechanical shock events.

State of the art snap rings are typically metal parts that achieve their final shape through the use of a stamping die. The stamping die tends to slightly round the edges on one face of each snap ring. This rounding is known as stamping "die roll" and it can typically survive subsequent forming (e.g. coining) steps (if any).

The actuator pivot bearing snap ring may be installed with its face having edges with stamping die roll adjacent to and in contact with the actuator arm structure. In this case, the other face of the snap ring will be adjacent to and in contact with a surface of the pivot bearing sleeve. Alternatively, the actuator pivot bearing snap ring may be installed with its face having edges with stamping die roll adjacent to and in contact with the pivot bearing sleeve. In this case, the other face of the snap ring will be adjacent to and in contact with a surface of the actuator pivot bearing sleeve.

The actuator arm structure is typically fabricated from aluminum or an alloy of aluminum and is therefore typically softer and more easily burnished than the pivot bearing sleeve, which is typically fabricated from stainless steel. Therefore, less debris comprising aluminum are generated if a conventional snap ring is installed in an orientation such that its face having edges with stamping die roll are adjacent to and in contact with the actuator arm structure.

Although debris comprising aluminum may be reduced by specifying orientation of the snap ring when installed, most state-of-the-art attempts to improve post-fabrication cleanliness of disk drive components have focused on pre- and post-assembly cleaning steps and on environmental cleanliness during assembly. The industry's marked reliance on cleaning steps survives even though assembly in clean environments and post-assembly cleaning steps are not thorough in their removal of contaminants and debris. Less frequently, disk drive designers consider the generation of debris and contamination earlier in the design of sub-components. Still, such consideration is often restricted to the selection of lubricants and adhesives.

Consequently, there remains much scope in the art for reducing debris generation via novel changes to the basic design or assembly of various sub-components of the disk drive. Since only one of the faces of a conventional snap ring has stamping die roll, regardless of the snap ring's orientation one of its faces will be prone to generate debris (either through burnishing of the surface of the actuator arm structure or via contact with the pivot bearing sleeve).

Therefore, there is a need in the art for an actuator pivot bearing snap ring that can generally prevent or generally reduce the creation of debris during assembly rather than relying on debris removal by post-assembly cleaning steps. Although the need in the art was described above in the context of magnetic disk drive information storage devices, the need is also present in other applications where a snap ring is used in a clean environment that must remain as free as possible of debris and contaminants.

SUMMARY OF THE INVENTION

A snap ring comprises an interior contour that extends about an opening. The interior contour has a first segment that is defined by a first radius that is rotated about a first origin within the opening. The interior contour has at least one second segment that is defined by a second radius that is rotated about a second origin within the opening.

BRIEF DESCRIPTION OF THE DRAWINGS

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION

A snap ring for applications requiring cleanliness has a novel recessed interior contour that reduces debris generation during installation of the snap ring.

Figure 1:
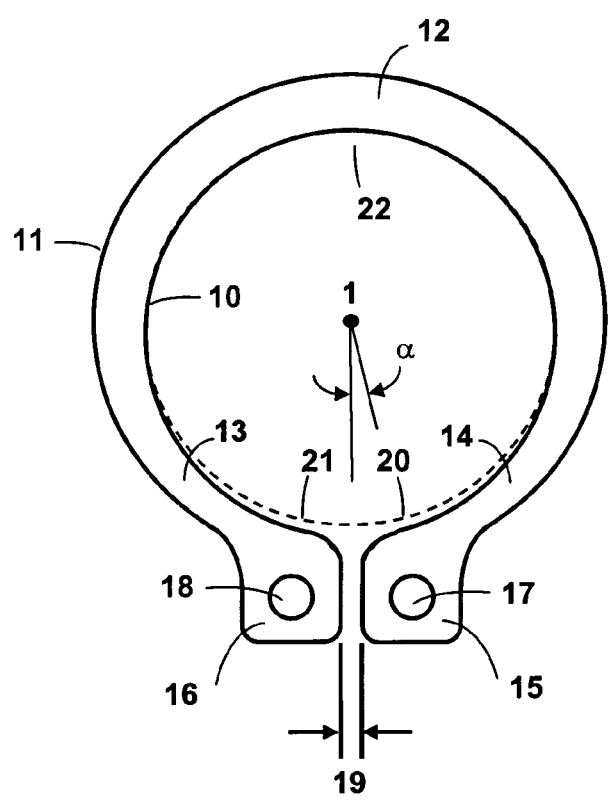
FIG. 1 is a plan view of a snap ring according to an embodiment of the present invention.

FIG. 1 shows a top view of an actuator pivot bearing snap ring according to an embodiment of the present invention, that illustrates several specific design features and associated nomenclature. The snap ring has an opening bounded by interior contour 10 and has an outer contour 11. In this embodiment, the width of the snap ring in hinge region 12 is wider than in neck regions 13 and 14. The snap ring terminates at two terminal regions 15 and 16 that may comprise tabs that include tooling holes 17 and 18, respectively. The snap ring is typically forcefully expanded during installation which temporarily increases the circumferential gap 19 between the terminal regions 15 and 16. The forceful expansion also causes the interior contour 10 to temporarily deform.

In the embodiment of FIG. 1, the interior contour 10 is not round in the undeformed ("free") state but rather substantially departs from a round contour (depicted by a dashed line) near localized regions 20 and 21. Localized regions 20, 21, and 22 include locations where the snap ring would most heavily tangentially contact an internal round object (e.g. installation cone) during installation, if the interior contour of the snap ring were round in the free state like conventional snap rings typically are. Such contact localizes into regions because an initially round interior contour, when expanded during the installation process, generally departs from being round during the period of expansion. However, in the embodiment of FIG. 1 contact is at least partially spread within or away from localized regions 20 and 21 because material is removed to recess the interior contour in these regions.

In the embodiment of FIG. 1, the interior contour 10 includes a segment that comprises at least half of the interior contour 10 and is defined by sweeping a radius centered at origin 1. The magnitude of the angle between a line passing through origin 1 and extending towards contact region 20 (or 21) and a downward pointing vertical line (also passing through origin 1) is represented in FIG. 1 by the Greek letter α.

Figure 2:
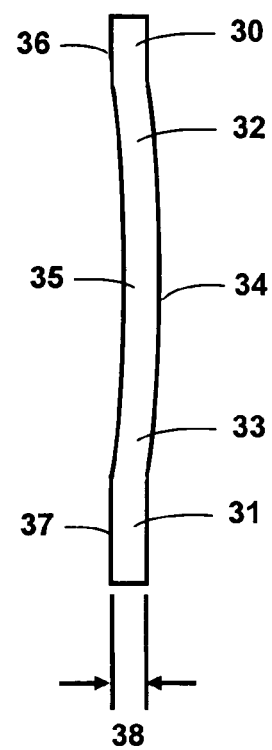
FIG. 2 is a side view of a snap ring according to an embodiment of the present invention.

FIG. 2 shows a side view of an actuator pivot bearing snap ring according to an embodiment of the present invention. The snap ring has thickness 38 and has one or more out-of-plane bends 32, 33 that cause regions 35 to have vertical stature relative to regions 30 and 31—enabling the snap ring to perform as an axial spring. The snap ring is axially compressed in its installed state, so that it has an axial preload after installation. This preload is maintained after installation because the preloaded snap ring contacts constraining surfaces of the parts to be relatively retained (e.g. actuator arm structure and actuator pivot bearing sleeve). In disk drive applications, depending on the orientation of the snap ring after installation, either surfaces 34 will contact the actuator arm structure while surfaces 36 and 37 contact one or more surfaces of the actuator pivot bearing sleeve, or surfaces 34 will contact one or more surfaces of the actuator pivot bearing sleeve while surfaces 36 and 37 contact the actuator arm structure.

Figure 3:
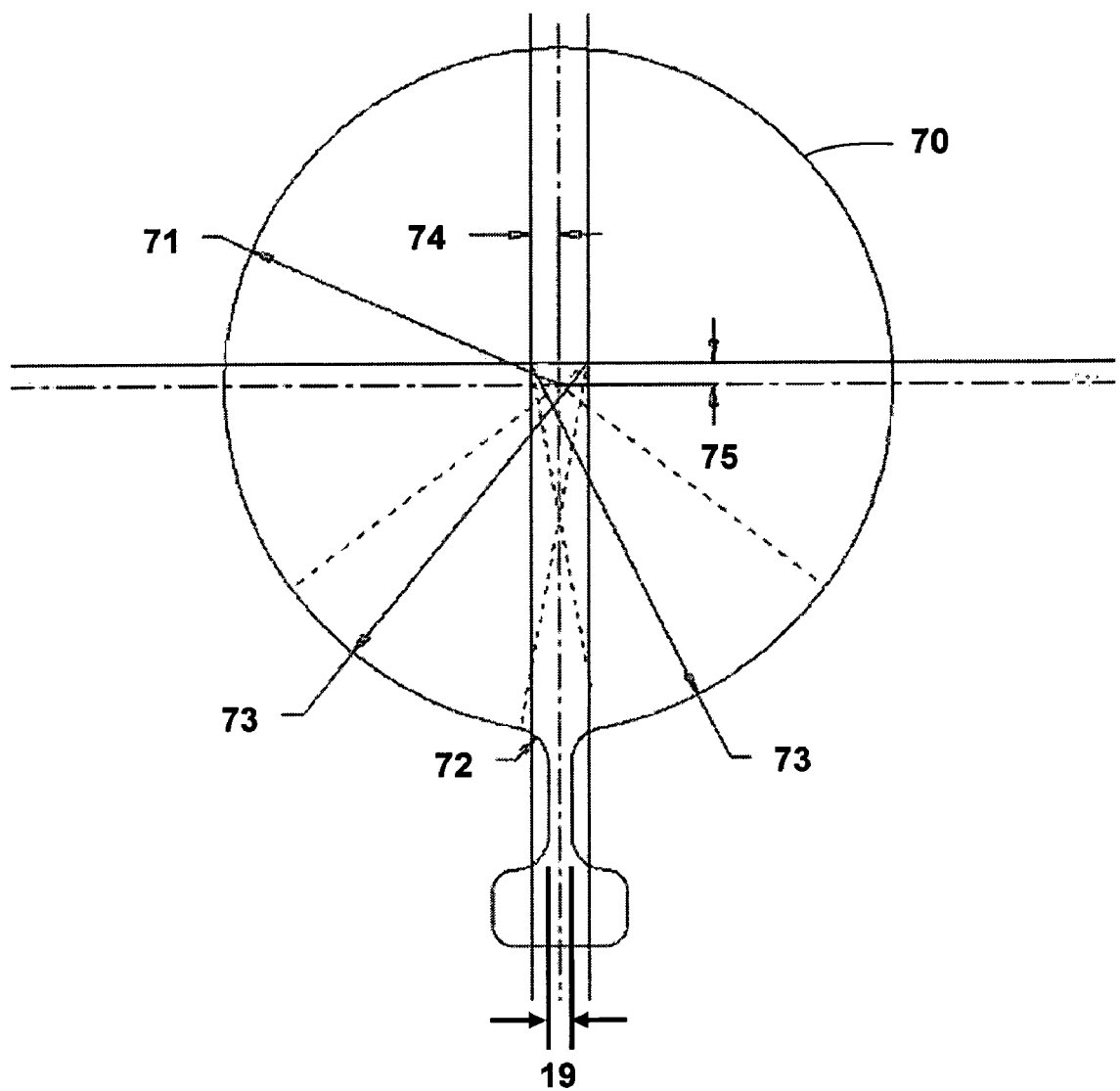
FIG. 3 is a drawing of the outer periphery of a stamping die punch used to fabricate the interior contour of a snap ring according to an embodiment of the present invention.

FIG. 3 is a drawing of the outer contour 70 of a stamping die punch used to fabricate the interior contour of a snap ring according to an embodiment of the present invention. In this embodiment, the majority of the interior contour of the snap ring is stamped (i.e. "punched") to an ordinary radius 71. However, near regions 20 and 21 (described earlier) the snap ring is stamped to a recessing radius 73. In the embodiment of FIG. 3, the origin of the recessing radius 73 is shifted horizontally from the origin of the ordinary radius 71 by a horizontal shift 74 and is shifted vertically by a vertical shift 75. If the origins were chosen to be coincident, and if recessing radius 73 were chosen to be greater in length than ordinary radius 71, then the radial reach of recessing radius 73 would exceed the radial reach of ordinary radius 71 everywhere on the interior contour. In that case, the boundary between a segment of the interior contour defined by ordinary radius 71 and any segment of the interior contour defined by recessing radius 73 might be characterized by an undesirable sharp radial transition.

A sharp radial transition can be avoided by including a transition segment of varying radius or by choosing the relationship between the recessing radius 73, the ordinary radius 71, the horizontal shift 74, and the vertical shift 75, as follows:

$$Radius_{73} = Radius_{71} + \sqrt{Shift_{74}^2 + Shift_{75}^2}$$

In order for the recessing radius 73 to cause an area of contact between the snap ring and the installation cone and/or actuator pivot bearing sleeve flange to shift and spread, and thereby decrease the associated contact pressure at the interfaces to reduce the propensity for scratching or galling of the contacting surfaces, the recessing radius 73 must reach further into the radial width of the snap ring in a region of expected contact than the ordinary radius 71 does. In the embodiment of FIG. 3, because the origins of ordinary radius 71 and recessing radius 73 are not coincident, the radial reach of recessing radius 73 is not assured to be greater than the radial reach of ordinary radius 71 merely by virtue of being greater in length. Rather, in the embodiment of FIG. 3, such reach is only assured if the recessing radius 73 is chosen to satisfy the following inequality:

$$Radius_{73} > \sqrt{(Radius_{71}\cos\alpha + Shift_{75})^2 + (Radius_{71}\sin\alpha + Shft_{74})^2}$$

where α represents the magnitude of the angle from a downward pointing vertical line passing through the origin of the ordinary radius to another line drawn from the origin of the ordinary radius to either of regions 20, 21 (where contact would occur if the interior contour were stamped at a radius equal to the ordinary radius everywhere along the contour except in the region of gap 19).

In certain embodiments, the choice of recessing radius 73, horizontal shift 74, and vertical shift 75 may be further constrained by a design requirement that at least half of the interior circumference of the snap ring be defined by ordinary radius 71.

In certain embodiments, the recessing radius 73 is further constrained to not exceed a reach where a resulting narrowness of the snap ring (in the radial direction) significantly weakens the snap ring such that its strain during installation or removal is concentrated in a localized region of weakness. In a particular embodiment, this constraint on the recessing radius 73 can be expressed in terms of a design requirement that the recessing radius 73 may not exceed a reach where the resulting ratio of the width, cubed, of the snap ring (in the radial direction) in a region of contact, divided by the distance from that region of contact to a tooling hole (e.g. one of tooling holes 17 or 18), becomes less than half of the minimum ratio of the cubed width of the snap ring (measured anywhere) divided by the distance from where that width is measured to said tooling hole. That is, in this particular embodiment, recessing radius 73 can not be chosen so large that:

$$\left|\frac{w_c^3}{d_c}\right| < 0.5 \left|\frac{w^3}{d}\right|_{min}$$

where $w_c$ is the width of the snap ring (in the radial direction) in a region of contact, $d_c$ is the lever arm distance from the aforementioned region of contact to a tooling hole (e.g. one of tooling holes 17 or 18), w is the width of the snap ring at any arbitrary point on the snap ring, and d is the distance from the arbitrary point on the snap ring where w is measured to said tooling hole.

Figures 4, 4A:
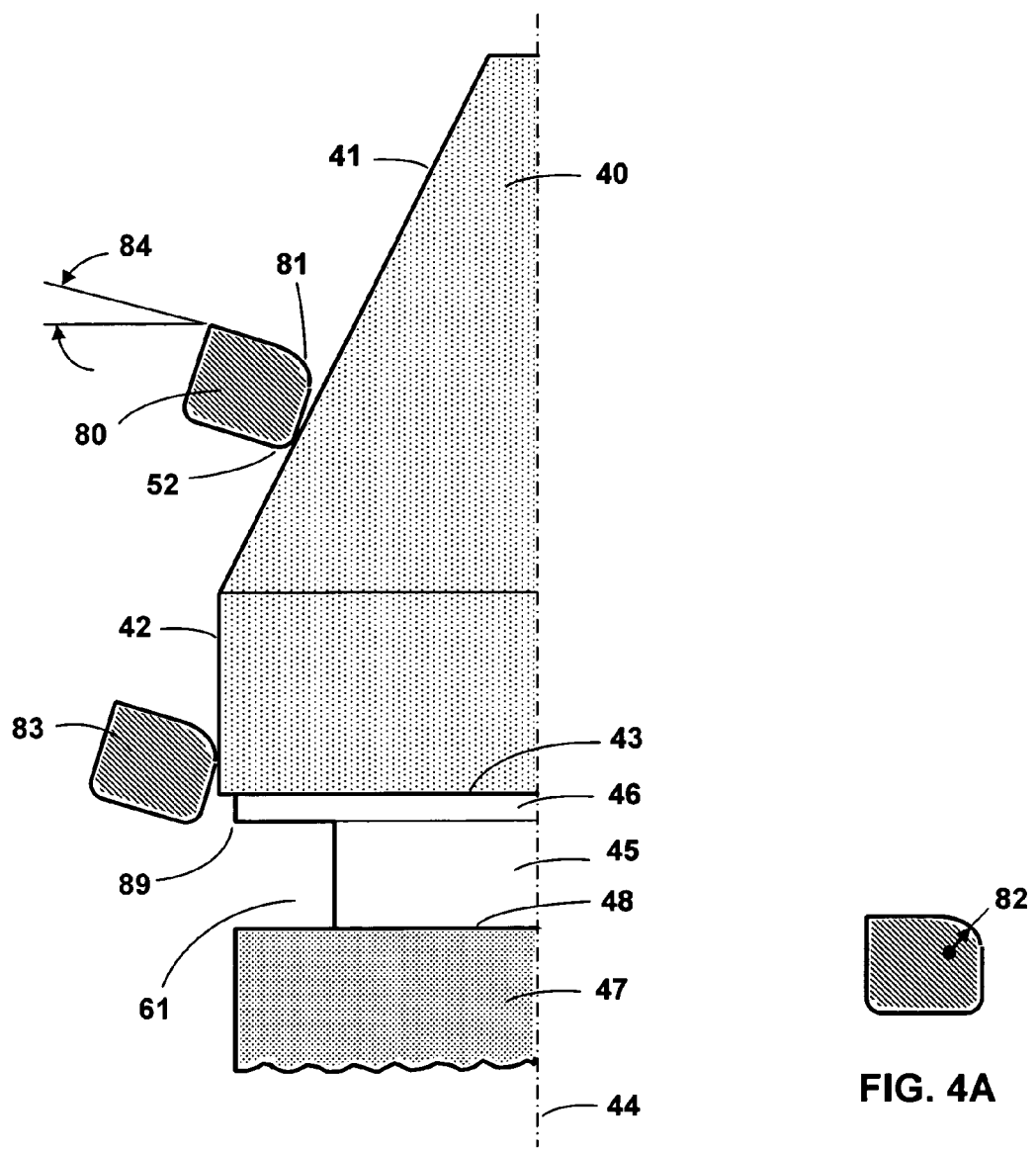
FIG. 4 depicts two instants in time during the installation of a snap ring according to an embodiment of the present invention, as used to retain an actuator pivot bearing relative to an actuator arm.
FIG. 4A shows in isolation and with tilt removed either of the snap ring cross sections shown with tilt and in context in FIG. 4.

FIG. 4 depicts two instants during the installation of a snap ring fabricated according to an embodiment of the present invention, to retain an actuator pivot bearing 45 relative to an actuator arm structure 47. To provide greater detail in FIG. 4, only the top portion of an actuator arm structure 47 is shown. The rest of the actuator arm structure 47 appears cut away in FIG. 4. Also to provide greater detail in FIG. 4 only the portion of the actuator arm structure 47 that falls to the left of axis of rotation 44 is shown. A portion of the actuator pivot bearing sleeve 45 is also visible in FIG. 4. Only the portion of the actuator pivot bearing sleeve that protrudes above the top surface 48 of actuator arm structure 47 can be seen, and only the portion of the actuator pivot bearing sleeve 45 that falls to the left of axis of rotation 44 is shown.

The actuator pivot bearing sleeve 45 is meant to be retained relative to the actuator arm structure 47 by a snap ring to be installed in grove 61. The axial preload of the snap ring will exert an upward force on the underside of top flange 46 of the actuator pivot bearing sleeve 45, and a downward force on the top surface 48 of the actuator arm structure 47.

Temporarily mounted on the top flange 46 of the actuator pivot bearing sleeve 45 is a snap ring installation cone 40. The snap ring installation cone 40 is only mounted during installation of the snap ring. Only the portion of the snap ring installation cone 40 that falls to the left of axis of rotation 44 is shown in FIG. 4. The snap ring installation cone 40 has an upper conical surface 41, a lower cylindrical surface 42, and a bottom edge 43. The snap ring installation cone 40 and the actuator pivot bearing sleeve 45 are typically fabricated from stainless steel, and the actuator arm structure 47 is typically fabricated from aluminum or an alloy of aluminum.

A cross-section 80 of a snap ring fabricated according to an embodiment of the present invention is shown in FIG. 4. Cross section 80 is taken at a location on the snap ring where the snap ring contacts the snap ring installation cone 40. The circumferential locations and extent of the regions of contact in this embodiment depend on the choices made for the design parameters defined with respect to FIG. 3 (i.e. recessing radius 73, horizontal shift 74, and vertical shift 75).

Note that bottom edge 52 of the snap ring has stamping die roll and is shown to be in sliding contact with the upper conical surface 41 of snap ring installation cone 40. Note also that snap ring cross section 80 is tilted by an angle 84 so that the portion of the cross section corresponding to top edge 81 ends up being the most proximate portion of the snap ring cross section 80 to the axis of rotation 44.

Cross section 80 tilts during circumferential expansion of the snap ring because of accompanying torsional deflection. The torsional deflection occurs during circumferential expansion of the snap ring because the snap ring is not flat but rather is fabricated, as previously described, with out-of-plane bends that cause certain regions to have vertical stature relative to other regions. The more the snap ring is circumferentially expanded, the greater will be the angle 84 of tilt. So when the snap ring is pushed further down the snap ring installation cone 40 to a new position where the cone has a larger diameter, not only is the snap ring further circumferentially expanded (causing temporary growth in gap 19), but the angle 84 of tilt of cross section 80 will increase also.

Cross section 83 in FIG. 4 is the same as cross section 80 except cross section 83 is depicted at a slightly later instant in time during the installation process, where both the temporary radial expansion and tilt of the snap ring are greater. Accordingly, top edge 81 of snap ring cross section 83 is depicted to be in sliding contact with the lower cylindrical surface 42 of snap ring installation cone 40, at the location on the snap ring where cross section 83 (and 80) is taken. During the final phase of the snap ring installation process, the contacting surface of top edge 81 of snap ring cross section 83 slides over the bottom edge 43 of snap ring installation cone 40, and over the bottom edge of actuator pivot bearing flange 46, at location 89, to "snap in" to actuator pivot bearing groove 61.

Tribological problems in magnetic disk drives sometimes have non-obvious causes that, once known, understood, and accounted for, give one disk drive manufacturer a competitive edge over another. The present inventors recognized that the final "snapping in" phase of the snap ring installation process can shear metal fragments from the edges of the snap ring installation cone 40 and the actuator pivot bearing sleeve flange 46, and such fragments can later contaminate the head-disk interface and ultimately lead to a head crash and possibly to data loss. Their solution to this problem is novel.

FIG. 4A shows in isolation and with tilt removed either of the snap ring cross sections that are shown with tilt and in the context of adjacent parts during installation in FIG. 4. In the embodiment of FIG. 4 and FIG. 4A, the edge lacking die roll (i.e. top edge 81 of the snap ring) is deliberately rounded (e.g. by a separate coining step) in at least a region of contact to provide a curved edge profile that can be approximately characterized by radius of curvature 82. In a preferred embodiment, the cross-sectional profile in a region of contact is adequately and practically blunted if the radius of curvature 82 is chosen to be in the design range of 40% to 85% of the thickness of the snap ring.

Figures 5, 5A:
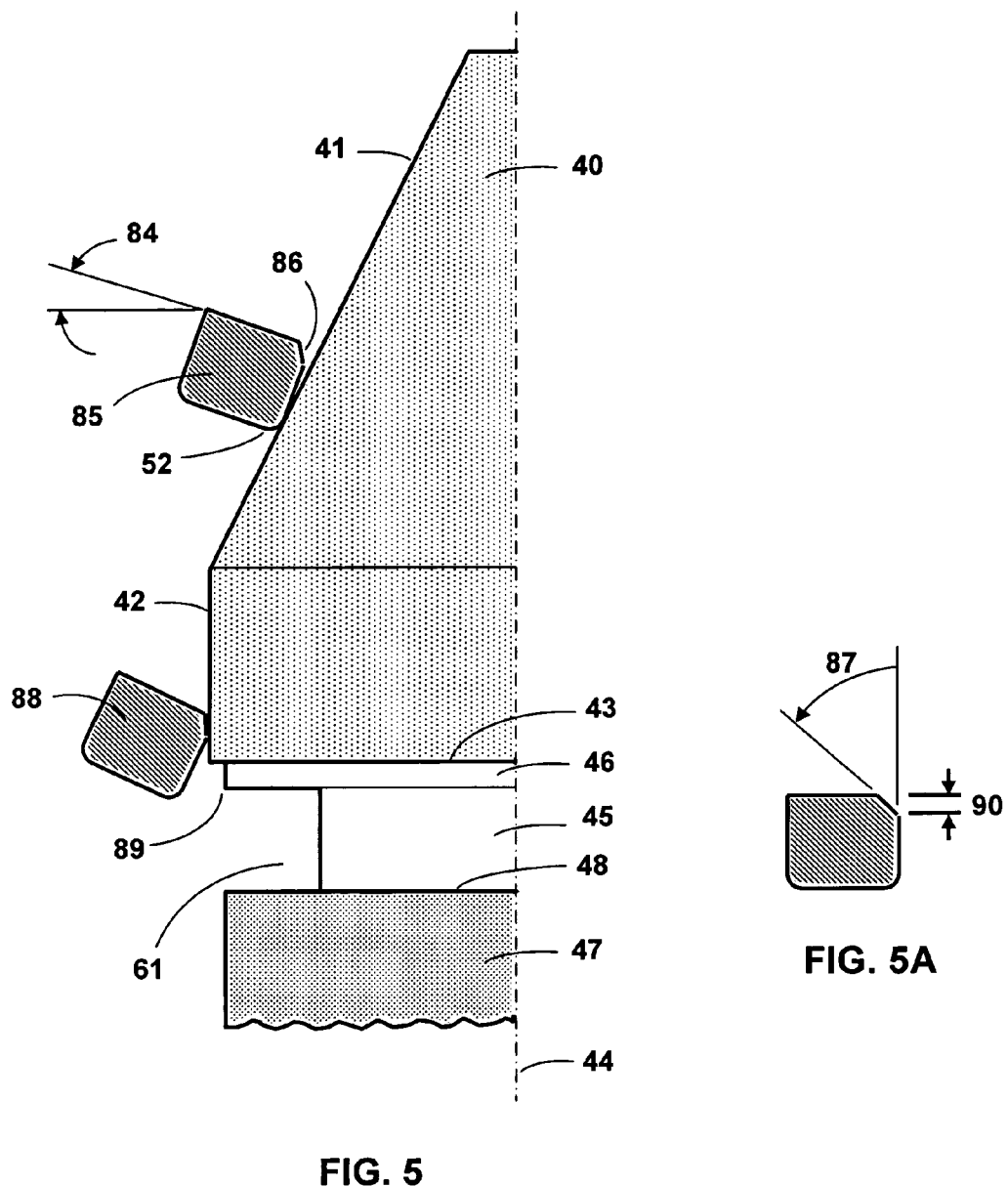
FIG. 5 depicts two instants in time during the installation of a snap ring according to another embodiment of the present invention, as used to retain an actuator pivot bearing relative to an actuator arm.
FIG. 5A shows in isolation and with tilt removed either of the snap ring cross sections shown with tilt and in context in FIG. 5.

FIG. 5 depicts two instants during the installation of a snap ring fabricated according to an embodiment of the present invention, to retain an actuator pivot bearing 45 relative to an actuator arm structure 47. FIG. 5 is meant to be generally similar to FIG. 4, except for a change to the geometry of the snap ring.

To provide greater detail in FIG. 5, only the top portion of an actuator arm structure 47 is shown. The rest of the actuator arm structure 47 appears cut away in FIG. 5. Also to provide greater detail in FIG. 5 only the portion of the actuator arm structure 47 that falls to the left of axis of rotation 44 is shown. A portion of the actuator pivot bearing sleeve 45 is also visible in FIG. 5. Only the portion of the actuator pivot bearing sleeve that protrudes above the top surface 48 of actuator arm structure 47 can be seen, and only the portion of the actuator pivot bearing sleeve 45 that falls to the left of axis of rotation 44 is shown.

Temporarily mounted on the top flange 46 of the actuator pivot bearing sleeve 45 is a snap ring installation cone 40. The snap ring installation cone 40 is only mounted during installation of the snap ring. Only the portion of the snap ring installation cone 40 that falls to the left of axis of rotation 44 is shown in FIG. 5. The snap ring installation cone 40 has an upper conical surface 41, a lower cylindrical surface 42, and a bottom edge 43.

A cross-section 85 of a snap ring fabricated according to an embodiment of the present invention is shown in FIG. 5. Cross section 85 is taken at a location on the snap ring where the snap ring contacts the snap ring installation cone 40. The circumferential locations and extent of the regions of contact in this embodiment depend on the choices made for the design parameters defined with respect to FIG. 3 (i.e. recessing radius 73, horizontal shift 74, and vertical shift 75).

Note that bottom edge 52 of the snap ring has stamping die roll and is shown to be in sliding contact with the upper conical surface 41 of snap ring installation cone 40. Note also that snap ring cross section 85 is tilted by an angle 84 so that the portion of the cross section corresponding to top edge 86 ends up being the most proximate portion of the snap ring cross section 85 to the axis of rotation 44.

Cross section 88 in FIG. 5 is the same as cross section 85 except cross section 88 is depicted at a slightly later instant in time during the installation process, where both the temporary radial expansion and tilt of the snap ring are greater. Accordingly, top edge 86 of snap ring cross section 88 is depicted to be in sliding contact with the lower cylindrical surface 42 of snap ring installation cone 40, at the location on the snap ring where cross section 88 (and 85) is taken. During the final phase of the snap ring installation process, the contacting surface of top edge 86 of snap ring cross section 88 slides over the bottom edge 43 of snap ring installation cone 40, and over the bottom edge of actuator pivot bearing flange 46, at location 89, to "snap in" to actuator pivot bearing groove 61.

FIG. 5A shows in isolation and with tilt removed either of the snap ring cross sections that are shown with tilt and in the context of adjacent parts during installation in FIG. 5. In the embodiment of FIG. 5 and FIG. 5A, the edge lacking die roll (i.e. top edge 86 of the snap ring) is deliberately beveled (e.g. by a separate coining step) in at least a region of contact to provide a flattened edge profile that can be approximately characterized by bevel angle 87 and bevel depth 90. In a preferred embodiment, the cross-sectional profile in a region of contact is adequately and practically blunted if the bevel angle 87 is chosen to be in the design range of 10° to 40° and the bevel depth is chosen to be in the design range of 60% to 85% of the thickness of the snap ring. The bevel angle and depth can be deliberately formed (e.g. by a separate coining step) within these design ranges during manufacture, after the stamping step that creates the interior radius of the snap ring.

Stamping (as well as coining) is generally accomplished using a press that pushes on a die that includes a die block and a die punch. A feeder advances the material to be stamped (e.g. a metal sheet) into or through the die, and a "stripper" clamps the material during stamping. The die punch is pressed against the die block or through a hole in the die block (in which case the punch must be smaller than the hole by a clearance). The clearance must be carefully selected to avoid the formation of burrs in the material that is stamped, yet also to ensure adequate life of the die components.

Any beveling that might occur incidentally due to stamping (i.e. so-called "die break") depends upon the stamping clearance and also depends upon the choice of the material to be stamped. Therefore, "die break" can not be controlled without affecting (potentially adversely) material properties, the avoidance of burrs, and the life of the die components. A bevel that is intentionally formed (e.g. by a separate coining step) can be controlled without these adverse consequences and also does not present a jagged edge that is characteristic of "die break".

While the invention has been particularly shown and described with reference to preferred embodiments thereof, it will be understood by those skilled in the art that the foregoing and other changes in form and detail may be made therein without departing from the scope of the invention.

What is claimed is:

1. A snap ring, comprising:
 a ring having an interior contour that extends about an opening, the interior contour having
 a first segment that is defined by a first radius that is rotated about a first origin within the opening,
 a second segment that is defined by a second radius being rotated about a second origin within the opening, and
 a third segment that is defined by the second radius being rotated about a third origin within the opening, the first origin being not coincident with the second origin or the third origin, and the second radius being greater than the first radius, wherein the second segment and the third segment are separated from each other by and adjacent to a circumferential gap in the ring, and wherein the first segment amounts to at least 50% of the interior contour.

2. The snap ring of claim 1, wherein the second origin is not coincident with the third origin.

3. The snap ring of claim 1, wherein the first segment joins the second segment without a distinct radial step discontinuity.

4. The snap ring of claim 1, wherein a radial reach of the second radius exceeds a radial reach of the first radius by a non-zero amount at least at one point on the interior contour.

5. An actuator arm assembly for an information storage device, comprising:

an actuator; and an actuator pivot bearing; and a snap ring retaining the actuator pivot bearing relative to the actuator, the snap ring comprising an interior contour extending about an opening, the interior contour having a first segment that is defined by a first radius being rotated about a first origin within the opening, a second segment that is defined by a second radius being rotated about a second origin within the opening, and a third segment that is defined by the second radius being rotated about a third origin within the opening, the first origin being not coincident with the second origin or the third origin, and the second radius being greater than the first radius, wherein the second segment and the third segment are separated from each other by and adjacent to a circumferential gap in the ring, and wherein the first segment amounts to at least 50% of the interior contour.

6. The snap ring of claim 5, wherein the second origin is not coincident with the third origin.

7. The actuator arm assembly of claim 5, wherein the first segment joins the second segment without a distinct radial step discontinuity.

8. The actuator arm assembly of claim 5, wherein a radial reach of the second radius exceeds a radial reach of the first radius by a non-zero amount at least at one point on the interior contour.

* * * * *